United States Defensive Publication [19] (H) [11] T100,202

Holfeld [43] Jan. 6, 1981

[54] PROCESS FOR CALENDERING KNIT FABRICS

[76] Inventor: Winfried T. Holfeld, 700 Thornby Rd., Wilmington, Del. 19803

[21] Appl. No.: 73,017

[22] Filed: Sep. 6, 1979

[51] Int. Cl.[3] ..... D06F 15/02

[52] U.S. Cl. ..... 38/144; 28/165

[57] ABSTRACT

Light weight knit fabrics of reduced air permeability and light transmission as well as decreased susceptibility to snagging are provided by a calendering process that involves selecting a dyed knit fabric composed of fibers from the group of (1) at least 40% by weight of polyester fiber and from 0 to 60% by weight of a fiber of the group consisting of wool, cotton, nylon, and acrylic fiber or (2) about 5–30% by weight of a spandex fiber and from 70 to 95% by weight of a fiber of the group consisting of wool, cotton, nylon, polyester and acrylic fiber and calendering the back side of the fabric at a calender roll temperature between about 200° to 320° F., at a calender roll pressure of between about 0.5 to 1.0 ton per linear inch and at a calender roll surface speed of from 10 to 30 yards per minute.

2 Claims, No Sheets Drawing,

13 Pages Specification

The file of this unexamined application may be inspected and copies thereof may be purchased (849 O.G. 1221, Apr. 9, 1968).